(12) United States Patent
Huang et al.

(10) Patent No.: US 10,533,543 B2
(45) Date of Patent: Jan. 14, 2020

(54) PUMP CAPABLE OF DISPENSING BOTH A LARGE VOLUME AND A SMALL VOLUME OF COLORANT

(71) Applicant: ZHENGZHOU SANHUA TECHNOLOGY & INDUSTRY CO., LTD, Xingyang (CN)

(72) Inventors: Song Huang, Xingyang (CN); Weihong Niu, Xingyang (CN)

(73) Assignee: ZHENGZHOU SANHUA TECHNOLOGY & INDUSTRY CO., LTD, Xingyang (CN)

( * ) Notice: Subject to any disclaimer, the term of this patent is extended or adjusted under 35 U.S.C. 154(b) by 7 days.

(21) Appl. No.: 15/537,787

(22) PCT Filed: Dec. 18, 2015

(86) PCT No.: PCT/CN2015/097973
§ 371 (c)(1),
(2) Date: Jun. 19, 2017

(87) PCT Pub. No.: WO2016/095865
PCT Pub. Date: Jun. 23, 2016

(65) Prior Publication Data
US 2017/0350377 A1    Dec. 7, 2017

(30) Foreign Application Priority Data

Dec. 19, 2014   (CN) .......................... 2014 1 0792472
Dec. 19, 2014   (CN) .......................... 2014 1 0792479
Dec. 19, 2014   (CN) .......................... 2014 1 0792555

(51) Int. Cl.
*F04B 5/00*         (2006.01)
*F04B 7/00*         (2006.01)
(Continued)

(52) U.S. Cl.
CPC .......... *F04B 13/00* (2013.01); *B01F 15/0462* (2013.01); *B67D 7/0277* (2013.01);
(Continued)

(58) Field of Classification Search
CPC .......... F04B 13/00; F04B 5/00; F04B 7/0003; F04B 15/02; F04B 53/10; F04B 49/22;
(Continued)

(56) References Cited

U.S. PATENT DOCUMENTS 3,851,798 A * 12/1974 Miller ................. B01F 13/1055
                                                                    222/135
4,060,178 A * 11/1977 Miller ....................... F04B 9/02
                                                                    192/48.2
(Continued)

FOREIGN PATENT DOCUMENTS

CN          101290002          10/2008
CN          201284727          8/2009
(Continued)

OTHER PUBLICATIONS

International Search Report, issued in the corresponding PCT/CN2015/097973, dated Mar. 22, 2016, 6 pages.

*Primary Examiner* — Frederick C Nicolas
(74) *Attorney, Agent, or Firm* — Hamre, Schumann, Mueller & Larson, P.C.

(57) ABSTRACT

A pump capable of dispensing both a large volume and a small volume of colorant comprises a large reciprocating positive displacement pump having a large reciprocating part, a large pump body and a large pump inlet-outlet opening, characterized in that: a small reciprocating part fixed to the large reciprocating part is disposed in the large pump body; a small pump body is disposed on a base of the large pump body, and provided with a small pump inlet-outlet opening; and the small reciprocating part, the small (Continued)

pump body and the small pump inlet-outlet opening constitute a small reciprocating positive displacement pump.

14 Claims, 16 Drawing Sheets

(51) Int. Cl.
| | |
|---|---|
| F04B 13/00 | (2006.01) |
| F04B 19/22 | (2006.01) |
| F04B 23/02 | (2006.01) |
| F04B 49/22 | (2006.01) |
| B01F 15/04 | (2006.01) |
| B01F 13/10 | (2006.01) |
| F04B 9/111 | (2006.01) |
| F04B 27/12 | (2006.01) |
| B67D 7/02 | (2010.01) |
| F04B 53/10 | (2006.01) |
| F16K 11/085 | (2006.01) |
| F16K 31/04 | (2006.01) |
| F04B 15/02 | (2006.01) |

(52) U.S. Cl.
CPC .............. *F04B 5/00* (2013.01); *F04B 7/0003* (2013.01); *F04B 9/111* (2013.01); *F04B 19/22* (2013.01); *F04B 23/02* (2013.01); *F04B 27/12* (2013.01); *F04B 49/22* (2013.01); *F04B 53/10* (2013.01); *F16K 11/085* (2013.01); *F16K 31/041* (2013.01); *B01F 13/1055* (2013.01); *B01F 2215/005* (2013.01); *F04B 15/02* (2013.01)

(58) Field of Classification Search
CPC .......... F04B 9/111; F04B 19/22; F04B 23/02; F04B 27/12; B01F 15/0462; B01F 13/1055; B01F 2215/005; F16K 11/085; F16K 31/041; B67D 7/0277
See application file for complete search history.

(56) References Cited

U.S. PATENT DOCUMENTS

| | | | |
|---|---|---|---|
| 4,203,554 A | 5/1980 | Zimmer et al. | |
| 5,474,211 A * | 12/1995 | Hellenberg | B01F 13/1058 141/104 |
| 7,311,223 B2 * | 12/2007 | Post | B01F 13/1058 222/1 |
| 7,644,840 B2 * | 1/2010 | Held | B01F 13/1058 222/135 |
| 8,240,513 B2 * | 8/2012 | Voskuil | B01F 13/1058 222/144 |
| 2005/0269367 A1 * | 12/2005 | Post | B01F 13/1058 222/185.1 |
| 2009/0236367 A1 | 9/2009 | Voskuil et al. | |
| 2012/0037666 A1 * | 2/2012 | Miller | G01F 15/005 222/255 |

FOREIGN PATENT DOCUMENTS

| | | |
|---|---|---|
| CN | 101576069 | 11/2009 |
| CN | 201827040 | 5/2011 |
| CN | 201943911 | 8/2011 |
| EP | 0273677 | 7/1988 |
| EP | 1147956 | 10/2001 |

* cited by examiner

PUMP CAPABLE OF DISPENSING BOTH A LARGE VOLUME AND A SMALL VOLUME OF COLORANT

TECHNICAL FIELD

The present invention relates to the field of reciprocating pumps, and specifically, to a reciprocating pump capable of dispensing both a large volume and a small volume of colorant.

BACKGROUND

In the technical field of color modulation, it is a key technique to dispense quantitative colorant by means of a reciprocating pump. At present, piston pumps, plunger pumps, folding pumps, etc., are common reciprocating positive displacement pumps. A strict requirement is made to the volume of colorant in color modulation, i.e. a requirement that an error of a dispensed volume of colorant cannot exceed a certain percentage (e.g., less than 1%) when a pump dispenses a large volume of colorant (e.g., greater than 15 ml), and an error of the dispensed volume of colorant cannot exceed a certain percentage (e.g., less than 12%) either with regard to the dispensing of a small volume of colorant (e.g., less than 0.5 ml). However, currently common reciprocating pumps for dispensing a large volume of colorant are high in dispensed volume per stroke and therefore, it may lead to great dispensing errors during dispensing of a small volume of colorant in spite of small errors in the stroke of the pumps, thus resulting in abnormal colors that cannot meet the requirements of products. Consequently, on the control standard for the colorant dispensing accuracy of the colorant dispensers, there is an undesirable situation that the accuracy requirement (e.g., 12%) for dispensing a small volume of colorant is lower than that (e.g., 1%) for dispensing a large volume of colorant. To solve this problem, in particular to reduce the errors in dispensing of a small volume of colorant, a stepper motor is usually used to realize the stroke of a reciprocating pump. However, the number of micro-steps of the stepper motor is limited. At present, a principal solution is disposing two colorant dispensers at the same time, one being a colorant dispenser essentially consisting of a large pump and mainly used for dispensing a large volume of colorant and the other one being a colorant dispenser essentially consisting of a small pump for dispensing a small volume of colorant. In this way, the volume of colorant dispensed by the control pump may be well controlled, but the disposing of two colorant dispensers not only costs much more, but also needs more space with inconvenience in use; therefore, this does not meet the requirements of intensive production in modern economy, and especially is not suitable for use in stores. Another solution is to dispose a pair of pumping-out systems for both large volume dispensing and small volume dispensing in parallel by connecting a large pump having a large-section cylinder body with a small pump having a small-section cylinder body in parallel in the same pump. This also involves the problems of large space occupation, complicated structure and high cost. Patent No. US2009236367A1 discloses a dual pump with two paint outlets, wherein springs are disposed in the pump to achieve the objective of disposing both a large volume and a small volume of colorant using one system; the springs are compressible such that the objective of dispensing a large amount of colorant is achieved when the pump presses down; further compression is carried out after a pillar abuts the bottom, and a thin rod continues to move downwardly to enter the piston chamber, thereby achieving the objective of high accuracy during dispensing of a smaller amount of colorant. The above prior art described above has the disadvantage of the above-mentioned structure being complicated with high cost, and the solves the problems by increasing a small dispensed colorant volume per stroke under the premise of guaranteeing high efficiency of dispensing of a large volume of colorant, such that a basically quantitative absolute error is reduced relative to the small dispensed colorant volume per stroke by the reciprocating lever so as to improve the accuracy of dispensing of a small volume of colorant. For example, a theoretical dispensed colorant volume per step of a stepper motor is reduced to improve the accuracy. In addition, it is general to improve the accuracy of disposing a small volume of colorant in this way in this industry.

In addition to the above-mentioned disadvantages of the prior art and its emphasis in problem solving as mentioned above, the product of patent No. US2009236367A1 also has the following defects: (1) when the pumps are not used for a long time, and thick colorant cannot be pressed down as usual and needs an increased force to press it down, the springs may be easily deformed under compression during dispensing of a large volume of colorant due to a certain elastic limit of the springs and certain friction between the piston and the wall, resulting in errors in the dispensing stroke of the pump; (2) a requirement of remarkably good leakproofness is made to the sliding device, whether the middle or the two sides, to avoid colorant leakage; (3) the pre-tightening force of the spring must be set; when the pre-tightening force of the spring is set to be greater, excessive motor power may be consumed, leading to energy waste; meanwhile, in dispensing of a small volume of colorant after the pump abuts the bottom, too much force applied to the pump body against the action of the spring may easily cause deformation, shifting and vibration of the frame and lead to changing of the stroke of the pump rod that may impact the accuracy of the dispensed volume; (4) when the pre-tightening force of the spring is set to be smaller with great resistance of colorant, it may easily cause compression of the spring, and therefore, the accuracy of the dispensed volume may also be influenced; and (5) air in the pump may seriously affect the accuracy of dispensing of a small volume of colorant.

SUMMARY OF THE INVENTION

An objective of the present invention is to overcome the shortcomings of the prior art and provide a reciprocating positive displacement pump with a large-section cylinder body that is capable of efficient large volume dispensing and also guaranteeing the accuracy of dispensing of a small volume of colorant.

The objective of the present invention is achieved by means of technical solutions as follows.

A pump capable of dispensing both a large volume and a small volume of colorant comprises a large reciprocating positive displacement pump that comprises a large reciprocating part, a large pump body and a large pump inlet-outlet opening, characterized in that: a small large reciprocating part fixed to the large reciprocating part is disposed in the large pump body; a small pump body is disposed on a base of the large pump body and provided with a small pump inlet-outlet opening; and the small large reciprocating part, the small pump body and the small pump inlet-outlet opening constitute a small reciprocating positive displacement pump.

The small pump body being disposed on the base of the large pump body means that the small pump body is disposed within the base of the large pump body.

The small pump body being disposed on the base of the large pump body means that the small pump body extends from a surface of the base of the large pump body.

Control valves are disposed to control the large pump inlet-outlet opening and the small pump inlet-outlet opening to connect with a canister or to dispense colorant.

The small large reciprocating part, the small pump body and the small pump inlet-outlet opening constitute a small reciprocating positive displacement pump.

The large reciprocating positive displacement pump is a large folding pump, a large plunger pump or a large piston pump, and the small reciprocating positive displacement pump is a small folding pump.

Alternatively, the large reciprocating positive displacement pump is a large folding pump, a large plunger pump or a large piston pump, and the small reciprocating positive displacement pump is a small plunger pump or a small piston pump with a small piston rod or a small plunger rod thereof projecting into a small cylinder body a length greater than or equal to the stroke of a large reciprocating part.

Alternatively, the large reciprocating positive displacement pump is a large folding pump, a large plunger pump or a large piston pump; the small reciprocating part is a small piston assembly or a small plunger rod; the small pump body is a small cylinder body; a maximum length of the small piston assembly or the small plunger rod projecting into the small cylinder body is less than the stroke of the large reciprocating part; and when the small piston assembly or the small plunger rod extends into the small cylinder body, the small piston assembly or the small plunger rod, the small cylinder body and the small pump inlet-outlet opening constitute a small plunger pump or a small piston pump.

The small pump body and the large pump body are disposed coaxially.

The large pump inlet-outlet opening and the small pump inlet-outlet opening are controlled by the control valves to connect with a canister or to dispense colorant, with at least the following connecting structures being involved:
1) where the large pump inlet-outlet opening connects with the canister; the small pump inlet-outlet opening connects with the canister; the large pump inlet-outlet opening and the small pump inlet-outlet opening both connect with the canister; and the aforesaid three ways are for single or combined use;
2) where single dispensing via the large pump inlet-outlet opening or dispensing via both the large pump inlet-outlet opening and the small pump inlet-outlet opening is allowed; or the large pump inlet-outlet opening connects with a colorant dispensing outlet for dispensing, or the large pump inlet-outlet opening and the small pump inlet-outlet opening both connect with the colorant dispensing outlet for dispensing; and
3) where single dispensing via the small pump inlet-outlet opening is allowed, or the small pump inlet-outlet opening connects with the colorant dispensing outlet for dispensing.

The control valves are sliding valves in which: a driving slider I is provided with an elongated large pump inlet-outlet opening and an elongated small pump inlet-outlet opening that connect with the large pump inlet-outlet opening and the small pump inlet-outlet opening, and a canister inlet-outlet opening is branched into a canister inlet-outlet opening I and a canister inlet-outlet opening II:

1) the canister inlet-outlet opening I and the canister inlet-outlet opening II connect with the large pump inlet-outlet opening and the small pump inlet-outlet opening, respectively;
2) the elongated large pump inlet-outlet opening and the elongated small pump inlet-outlet opening are both exposed; and
3) the large pump inlet-outlet opening connect with the canister inlet-outlet opening I, and the elongated small pump inlet-outlet opening is exposed to serve as a dispensing outlet.

The control valve comprises a valve body and a valve core; the valve body is provided with a large pump inlet-outlet opening, a small pump inlet-outlet opening, a canister inlet-outlet opening and a colorant dispensing outlet, wherein the canister inlet-outlet opening connects with a branch canister inlet-outlet opening I by means of a first branch channel and with the branch canister inlet-outlet opening II by means of a second branch channel; the valve core is provided with an axial channel; a radial channel I, a radial channel II and a radial channel III connect with the axial channel respectively; the valve core is provided in a surface thereof with an arc groove channel; the arc groove channel and the radial channel I correspond to the large pump inlet-outlet opening, and the axial channel invariably connects with the small pump inlet-outlet opening:
1) when the radial channel I connects with the branch canister inlet-outlet opening II, the radial channel I connects with a canister for suction of colorant; and when the radial channel I connects with the branch canister channel inlet-outlet opening I, the arc groove channel and the radial channel I both connect with the canister channel inlet-outlet opening for suction of colorant;
2) when the radial channel III is aligned to the colorant dispensing outlet, the radial channel I connects with the large pump inlet-outlet opening; that is, the large pump inlet-outlet opening and the small pump inlet-outlet opening both connect with the radial channel III by means of the axial channel, and the radial channel III dispenses a large volume of colorant with other channels being closed; and
3) when the radial channel II is aligned to the colorant dispensing outlet, the arc groove connects with the canister inlet-outlet opening I; that is, colorant from the large pump inlet-outlet opening returns; the small pump inlet-outlet opening connects with the axial channel that connects with the radial channel II, and the radial channel II dispenses a small volume of colorant by means of the colorant dispensing outlet with other channels being closed.

Further, the canister inlet-outlet opening is branched into the canister inlet-outlet opening I and the canister inlet-outlet opening III, both of which are located at sides of the valve core, and further branched into a canister inlet-outlet opening III and a canister inlet-outlet opening IV, both of which are located at sides of the valve core; the canister inlet-outlet opening III and the canister inlet-outlet opening IV correspond to the radial channel II and the radial channel III; 1) when the radial channel I connects with the canister channel inlet-outlet opening II, the radial channel III connects with the branch canister inlet-outlet opening III, and the radial channel II connects with the branch canister inlet-outlet opening IV, and the small pump inlet-outlet opening connects with a canister for suction of colorant; and 2) when the radial channel I connects with the canister channel inlet-outlet opening I, the radial channel III connects with the branch canister inlet-outlet opening IV, and the radial channel II connects with the branch canister inlet-outlet opening III, and the large pump inlet-outlet opening and the small pump inlet-outlet opening connect with a canister for suction of colorant.

The control valve comprises a valve body II and a valve core II; the valve body II is provided with a large pump inlet-outlet opening, a small pump inlet-outlet opening, a canister inlet-outlet opening and a colorant dispensing outlet, wherein the canister inlet-outlet opening connects with a branch canister inlet-outlet opening I by means of a first branch channel and with a branch canister inlet-outlet opening II by means of a second branch channel, and is provided with a third branch channel; the valve core II is provided with an axial channel; a radial channel I, a radial channel II and a radial channel III connect with the axial channel respectively; the valve core II is provided in a surface thereof with an arc groove channel; the arc groove channel and the radial channel I correspond to the large pump inlet-outlet opening; and a radial small pump channel I, a radial small pump channel II, a radial small pump channel III and an axial small pump channel are disposed axially spaced apart by 90° on the part of the axial channel that corresponds to the small pump inlet-outlet opening:

1) when the radial channel I connects with the branch canister inlet-outlet opening II, the radial channel I is connected, and the large pump inlet-outlet opening connects with the arc groove channel and the branch canister channel inlet-outlet opening I; and the small pump inlet-outlet opening connects with the canister inlet-outlet opening by means of the axial small pump channel for suction of colorant with other channels being closed;
2) when the radial channel III is aligned to the colorant dispensing outlet, the large pump inlet-outlet opening connects with the axial channel by means of the radial channel I; the small pump inlet-outlet opening connects with the axial channel by means of the radial small pump channel III; that is, the large pump inlet-outlet opening and the small pump inlet-outlet opening both connect with the radial channel III by means of the axial channel, and the radial channel III dispenses a large volume of colorant with other channels being closed; and
3) when the radial channel II is aligned to the colorant dispensing outlet, the arc groove connects with the canister inlet-outlet opening II; that is, the colorant from the large pump inlet-outlet opening returns; the small pump inlet-outlet opening connects with the axial channel by means of the radial small pump channel I; the axial channel connects with the radial channel II that dispenses a small volume of colorant through the colorant dispensing outlet with other channels being closed. Further, the canister inlet-outlet opening is branched into the canister inlet-outlet opening I and the canister inlet-outlet opening II, both of which are located at sides of the valve core, and further branched into a canister inlet-outlet opening III and a canister inlet-outlet opening IV, both of which are located at sides of the valve core; the canister inlet-outlet opening III and the canister inlet-outlet opening IV correspond to the radial channel II and the radial channel III;
1) when the radial channel I connects with the canister channel inlet-outlet opening II, the radial channel III connects with branch canister inlet-outlet opening III, and the radial channel II connects with the canister inlet-outlet opening IV; and 2) when the radial channel I connects with canister channel inlet-outlet opening I, the radial channel II connects with the branch canister inlet-outlet opening III, and the radial channel III connects with the canister inlet-outlet opening IV.

In the control valve, a base of a large cylinder body is provided with a dispensing outlet and a canister channel; a rotary valve core IV is disposed in the large cylinder body; a small cylinder body is disposed in the axis of the rotary valve core IV, and a small pump inlet-outlet opening radially projects out of the small cylinder body; a large pump inlet-outlet opening is provided outside the small cylinder body, and another inlet-outlet opening projects out of the small cylinder body, and connects with another inlet-outlet opening of the large pump to form a combined inlet-outlet opening,
1) the combined inlet-outlet opening is aligned to the canister channel for suction of colorant;
2) the large pump inlet-outlet opening or the combined inlet-outlet opening is aligned to the dispensing outlet to dispense a large volume of colorant; and
3) the small pump inlet-outlet opening is aligned to the dispensing outlet to dispense a small volume of colorant.

The reciprocating positive displacement pump provided in the present invention may achieve dispensing of both a large volume and a small volume of colorant by using a large-section pump, and thus guarantees the accuracy of the dispensed volume of colorant, and in particular, the accuracy of dispensing of a small volume of colorant. The reciprocating positive displacement pump, when compared with the prior art, has the advantages of high accuracy and simple structure, and when compared with the structure in patent No. US2009236367A1, has the advantages of good leak-proofness, high utilization of the reciprocating pump cylinder body in the length direction, and improved stroke accuracy of the reciprocating pump due to less elastic deformation of the pump support. When the reciprocating pump is placed upwardly (i.e., the reciprocating rod moves upwards, and colorant is drawn into the cylinder body from below the reciprocating pump) or used horizontally, the problem of the accuracy of dispensing of a small volume of colorant being affected seriously by air accumulation in the pump, which has not been well solved, is solved. Also, the colorant dispenser constituted by the pump is convenient to use and small in occupied area.

DETAILED DESCRIPTION OF THE EMBODIMENTS

Descriptions will be made below in conjunction with drawings and embodiments.

Figure 1A:
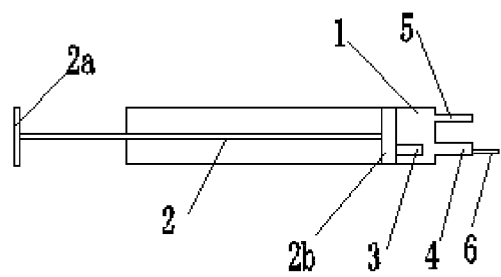
FIG. 1a is a diagram of a basic structure of the present invention.
Figure 1B:
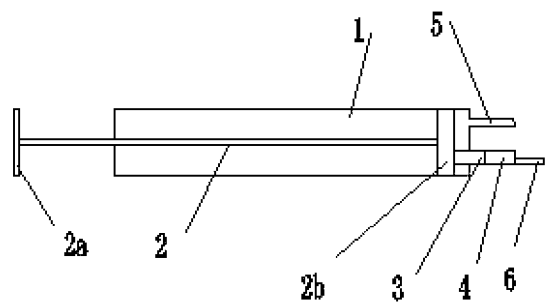
FIG. 1b is an operating diagram of the basic structure of the present invention.

A colorant pump capable of dispensing both a large volume and a small volume of colorant disclosed in the present invention, as shown in FIGS. 1a and 1b, essentially consists of a volume-variable space I large pump body or large cylinder body 1, a large reciprocating part (comprising a large reciprocating lever 2, an energy applying end 2a of the large reciprocating lever 2, and a piston 2b driven by the large reciprocating lever 2), a volume-variable space II small pump body or small cylinder body 4, a small reciprocating part or small reciprocating lever 3, a large pump inlet-outlet opening 5 and a small pump inlet-outlet opening 6. The large cylinder body 1, the large reciprocating part and the large pump inlet-outlet opening 5 constitute a large reciprocating positive displacement pump; the small reciprocating part, the small pump body and the small pump inlet-outlet opening 6 constitute a small reciprocating positive displacement pump; and the small reciprocating positive displacement pump and the large reciprocating positive displacement pump operate simultaneously. Certainly, a person skilled in the art may also implement the present invention using a plunger pump head instead of the large reciprocating lever 2 and the piston 2b. As shown in FIG. 1a, when the small reciprocating lever 3 is not inserted in the small cylinder body 4, dispensing of a large volume of colorant is achieved by means of the reciprocating motion of the large reciprocating lever 2 in the large cylinder body 1, and the colorant in the large cylinder body 1 is sucked in or expelled out via the small pump inlet-outlet opening 6 and the large pump inlet-outlet opening 5. As shown in FIG. 1b, when the small reciprocating lever 3 is inserted in the small cylinder body 4, the volume of the colorant dispensed by the large reciprocating lever 2 in the large cylinder body 1 is divided into two fractions: one is the volume dispensed via the small pump inlet-outlet opening, and the other one is the volume dispensed via the large pump inlet-outlet opening; thus, under the circumstance of dispensing via the small pump inlet-outlet opening and returning to a canister via the large pump inlet-outlet opening, it is small volume dispensing; and for dispensing via both the small pump inlet-outlet opening and the large pump inlet-outlet opening, it is large volume dispensing. The small reciprocating lever 3 forms a pump for dispensing a small volume of colorant within the small cylinder body 4 to dispense a small volume of colorant via the small pump inlet-outlet opening 6, and in this case, the colorant in the large cylinder body 1 is expelled into the canister via the large pump inlet-outlet opening 5, thereby achieving dispensing of a small volume of colorant. In this figure, the axis of the small cylinder body 4 is non-coaxial with that of the large cylinder body 1.

Figure 2A:
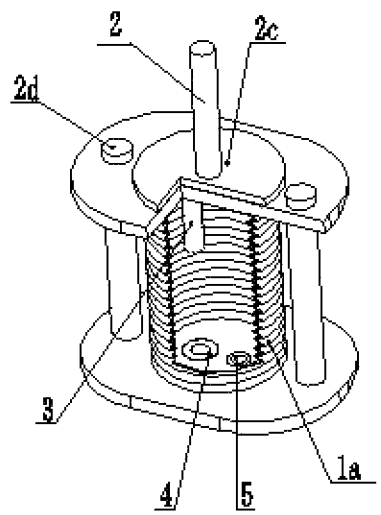
FIG. 2a is an operating diagram of a large pump when the present invention is implemented as a folding pump.
Figure 2B:
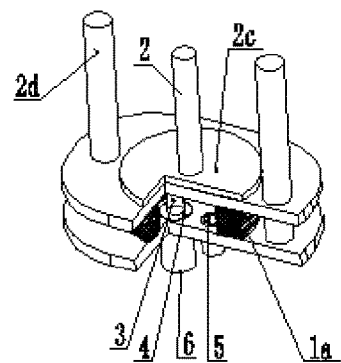
FIG. 2b is an operating diagram of a small pump when the present invention is implemented as a folding pump.

FIGS. 2a and 2b are diagrams of the volume-variable space I as a folding body 1a of a folding pump, wherein the folding body 1a is the large pump body. FIG. 2a shows the operating condition of the large pump when the small reciprocating lever 3 or small reciprocating part is not in the small pump body (i.e., the small cylinder body 4), and FIG. 2b shows the operating condition of the small pump when the small reciprocating lever 3 is in the small cylinder body 4. The operating principle thereof is the same as that in FIGS. 1a and 1b, i.e., the folding body 1a being equivalent to the large pump body 1, and the large reciprocating lever 2 and a large reciprocating plate 2c connected thereto constituting the large reciprocating part. Other parts include the small reciprocating part 3, the small pump body 4, the large pump inlet-outlet opening 5, the small pump inlet-outlet opening 6, and a guiding pillar 2d. This embodiment is also an embodiment where the small pump body 4 being non-coaxial with that of the folding body 1a.

Figure 2C:
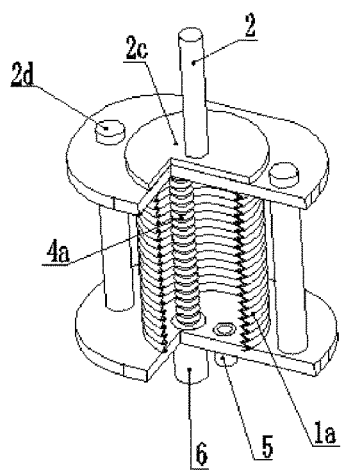
FIG. 2c is a diagram of a small pump which is also folding pump when the present invention is implemented as a folding pump.

As shown in FIG. 2c, the large reciprocating positive displacement pump is a large folding pump. The large reciprocating lever 2 and the large reciprocating plate 2c connected thereto constitute the large reciprocating part; the large reciprocating lever 2 drives the large reciprocating plate 2c into reciprocating motion along the guiding pillar 2d; the large pump inlet-outlet opening 5 is provided in the base of the large folding pump body 1a; a small folding pump body 4a is nested in the large folding pump body 1a (i.e., large pump); the small pump inlet-outlet opening 6 is provided in the base of the small folding pump body 4a; and the small reciprocating part is partial plate surface of the large reciprocating plate 2c that corresponds to the small folding pump body 4a.

Figure 3A:
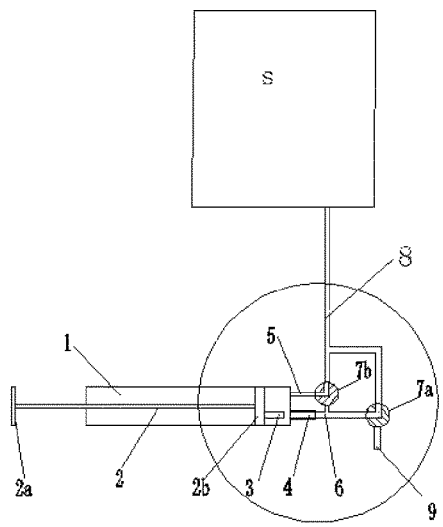
FIG. 3a is a diagram of suction of colorant when control valves are three-way valves.
Figure 3B:
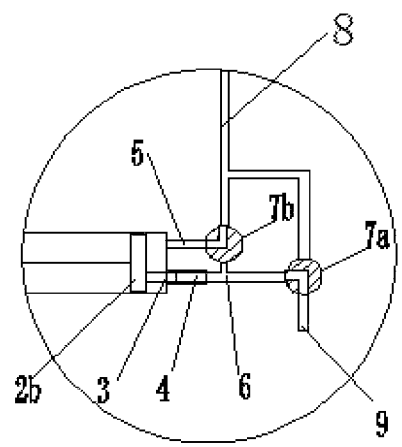
FIG. 3b is an operating diagram of a small pump when control valves are three-way valves.
Figure 3C:
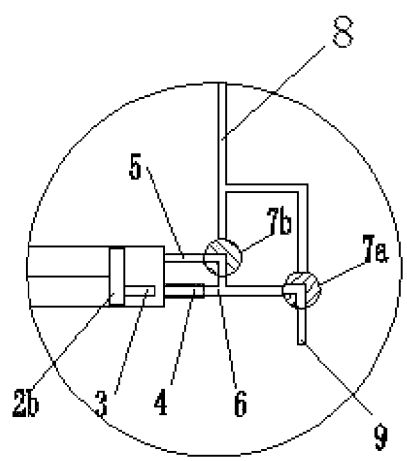
FIG. 3c is a diagram of simultaneous operation of a large pump and a small pump when control valves are three-way valves.
Figure 3D:
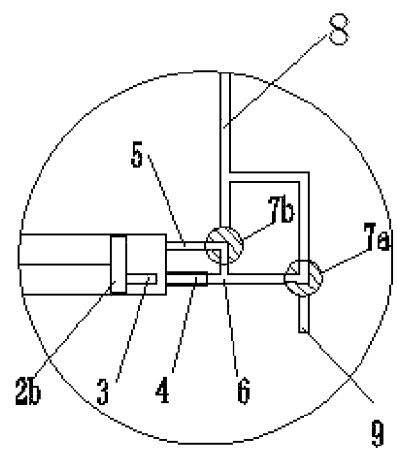
FIG. 3d is another operating diagram of suction of colorant when control valves are three-way valves.

FIGS. 3a, 3b, 3c and 3d show an embodiment of a colorant pump capable of dispensing both a large volume and a small volume of colorant. Two three-way valves are used to control the large pump inlet-outlet opening 5 and the small pump inlet-outlet opening 6 to connect with a colorant dispensing outlet. The three-way valve is not limited to rotary valve, and may also be electromagnetic three-way valve, sliding bar three-way valve, sliding vane three-way valve, or the like. The two three-way valves may be used for individual control, and may also be connected to simultaneously control opening and closing of various channels. As shown in FIG. 3a, the large reciprocating lever 2, the energy applying end 2a of the large reciprocating lever 2 and the piston 2b driven by the large reciprocating lever 2 constitute the large reciprocating part, colorant circulating channels are provided between the small reciprocating part or small reciprocating lever 3, the large pump inlet-outlet opening 5, the small pump inlet-outlet opening 6, and a canister inlet-outlet opening 8 and a colorant dispensing outlet 9; the large pump inlet-outlet opening 5 connects with the first port of the three-way valve II 7b; the second port of the three-way valve II 7b connects with the canister inlet-outlet opening 8; the small pump inlet-outlet opening 6 connects with the first port of the three-way valve I 7a; the second port of the three-way valve I 7a connects with the colorant dispensing outlet 9; the third port of the three-way valve II 7b connects with the channel between the small pump inlet-outlet opening 6 and the three-way valve I 7a; and the third port of the three-way valve I 7a connects with the channel for the second port of the three-way valve II 7b connecting with the canister inlet-outlet opening 8. As shown in FIG. 3a, the large pump inlet-outlet opening 5 and the small pump inlet-outlet opening 6 both connect with the canister inlet-outlet opening 8, and then the objective of suction of colorant may be achieved by drawing the large reciprocating lever 2; the directions of the three-way valve I 7a and the three-way valve II 7b are adjusted to where FIG. 3b shows such that the large pump inlet-outlet opening 5 connects with the canister inlet-outlet opening 8 and the small pump inlet-outlet opening 6 connects with the colorant dispensing outlet 9, and then the objective of small volume dispensing by the small pump and returning from the large pump to the canister, i.e., dispensing of a small volume of colorant, may be achieved; the directions of the three-way valve I 7a and the three-way valve II 7b are adjusted to where FIG. 3c shows such that the large pump inlet-outlet opening 5 and the small pump inlet-outlet opening 6 both connect with the colorant dispensing outlet 9, and then the objective of simultaneous dispensing by the small pump and the large pump, i.e., large-dosage dispensing of colorant, may be achieved; and as shown in FIG. 3d, the large pump inlet-outlet opening 5 and the small pump inlet-outlet opening 6 both connect with the canister inlet-outlet opening 8, and then the objective of suction of colorant may be achieved as well.

Figure 4:
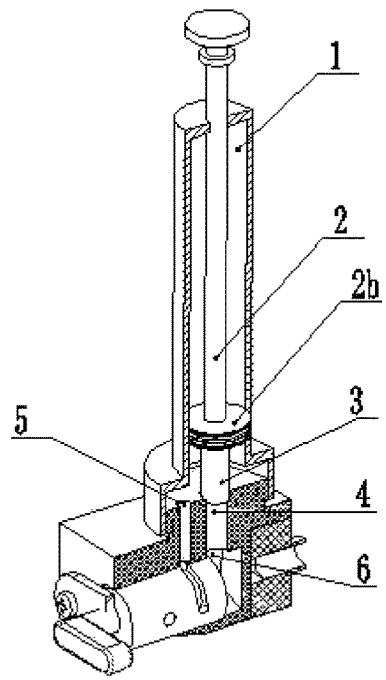
FIG. 4 is a diagram of a structure where a large reciprocating lever is invariably in a small cylinder body.
Figure 5:
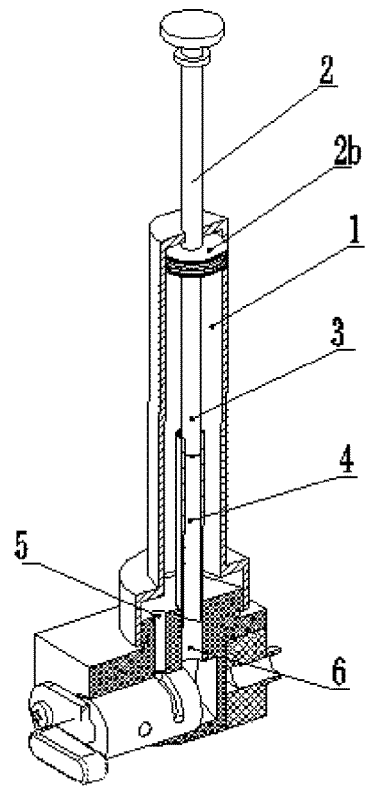
FIG. 5 is a diagram of a structure where a large reciprocating lever is detachable from a small cylinder body.

A colorant pump capable of dispensing both a large volume and a small volume of colorant, as shown in FIG. 4, is a piston pump comprising the large cylinder body 1 (i.e., the large pump body) and the large reciprocating level 2 which is a piston rod. The piston rod achieves suction or extrusion by means of the piston 2b, and the large reciprocating level 2 and the piston 2b constitute the large reciprocating part. The small reciprocating lever 3 extends from the piston 2b into the cylinder. A reciprocating pump constituted by the large cylinder body 1 and the large reciprocating part is referred to as the large pump. Another cylinder body is disposed in the base of the large cylinder body 1, referred to as the small cylinder body 4 (i.e., the small pump body). A hole may be directly bored in or a pipe may be disposed on the large cylinder body 1 to serve as the small cylinder body 4, and the large cylinder body 1 and the small cylinder body 4 are disposed coaxially, as shown in FIG. 4; the end, projecting into the cylinder, of the large reciprocating lever 2 is connected to another reciprocating lever which is referred to as the small reciprocating lever 3 (i.e., the small reciprocating part). The small cylinder body 4 may match with the small reciprocating lever 3 to constitute the small pump. The small cylinder body 4 is provided with the small pump inlet-outlet opening 6, and the large cylinder body 1 is provided with the large pump inlet-outlet opening 5. The length of the small reciprocating lever 3 projecting into the small cylinder body 4 is greater than or equal to the stroke of the large reciprocating lever 2, and in this case, the small reciprocating lever 3 is invariably in the small cylinder body 4. Also, the length of the small reciprocating lever 3 projecting into the small cylinder body 4 may be less than the stroke of the large reciprocating lever 2, as shown in FIG. 5, and in this case, the small reciprocating lever 3 may be detached from the small cylinder body 4. Control valves may be provided for the large pump inlet-outlet opening 5 and the small pump inlet-outlet opening 6 to control connection thereof with a canister or to control dispensing there through. FIGS. 4 and 5 show an embodiment where the small cylinder body 4 and the large cylinder body 1 are disposed coaxially, thus allowing easier manufacturing and implementation.

Figure 6:
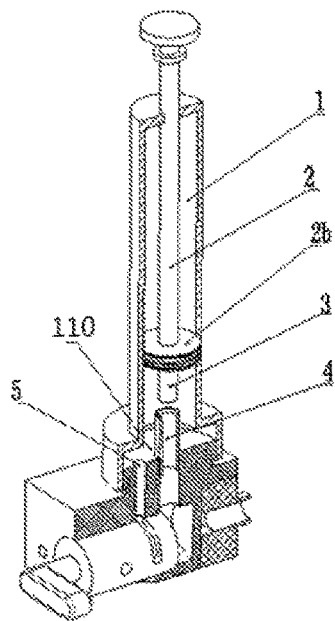
FIG. 6 is a diagram of a structure where a small pump body extends from the surface of a base of a large pump body.

In the present invention, the small pump body being disposed on the base of the large pump body means that the small pump body extends from the surface of the base of the large pump body, and in this case, the small cylinder body 4 protrudes from the surface 110 of the base of the large cylinder body 1, as shown in FIG. 6.

The control valves may be rotary valves, sliding valves, or stop valves in other form that may achieve the above-mentioned functions.

Figure 7A:
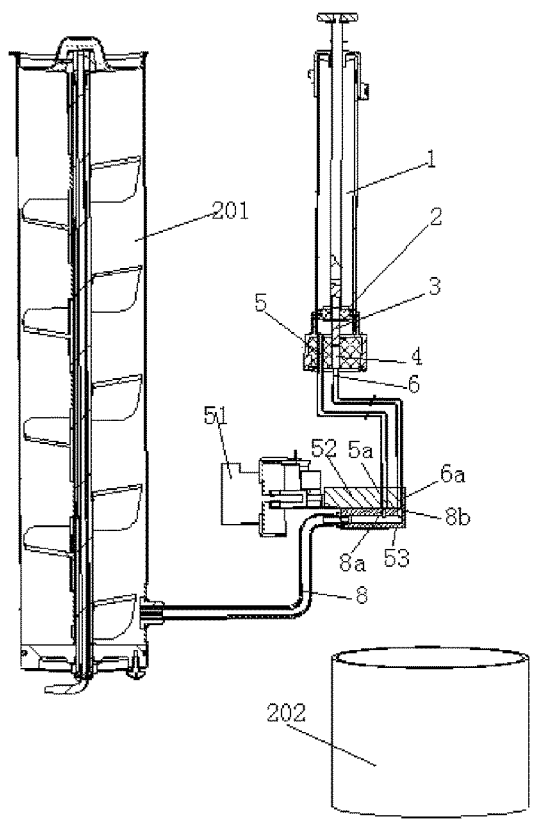
FIG. 7a is a diagram of suction of colorant when control valves are sliding valves.
Figure 7B:
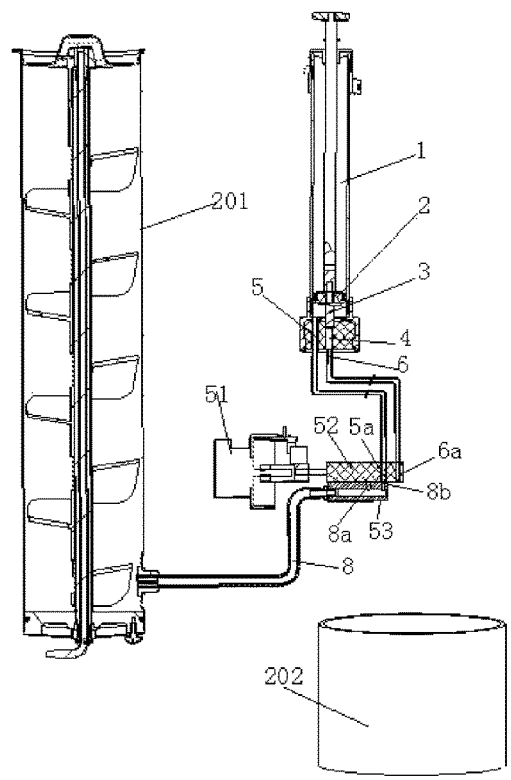
FIG. 7b is an operating diagram of a small pump when control valves are sliding valves.
Figure 7C:
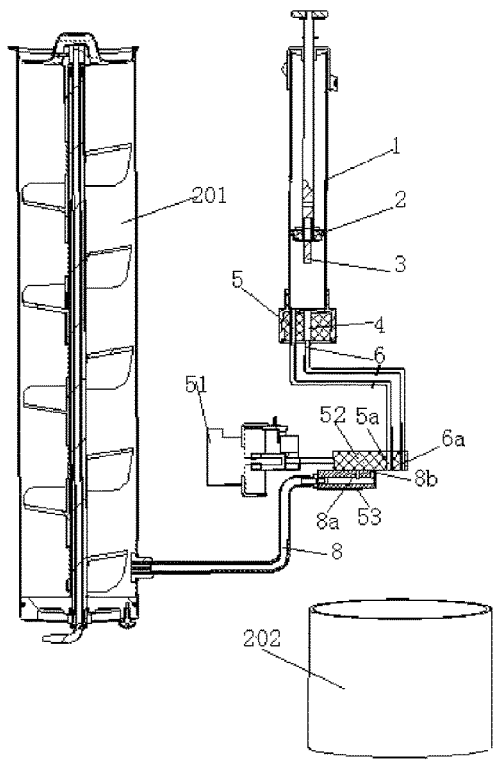
FIG. 7c is an operating diagram of a large pump when control valves are sliding valves.
Figure 8A:
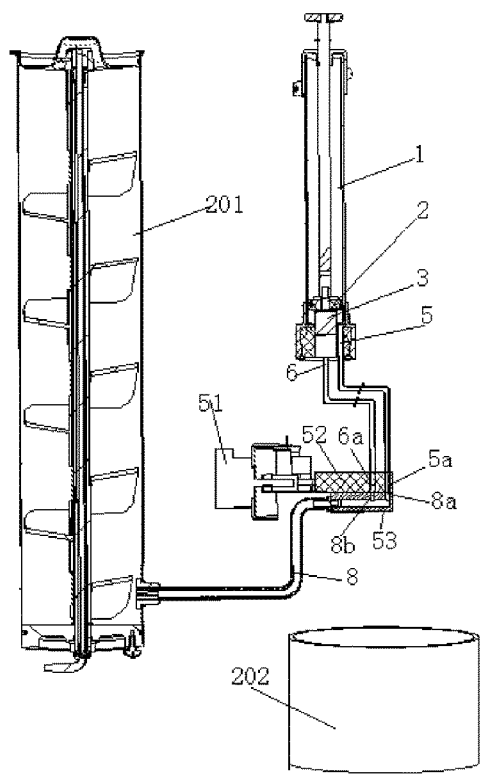
FIG. 8a is a diagram of suction of colorant when control valves are sliding valves and a small pump has a greater diameter.
Figure 8B:
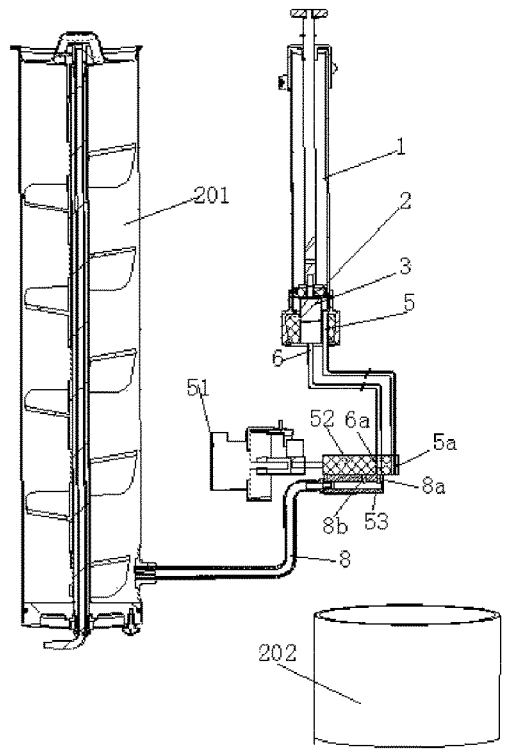
FIG. 8b is an operating diagram of a small pump when control valves are sliding valves and the small pump has a greater diameter.
Figure 8C:
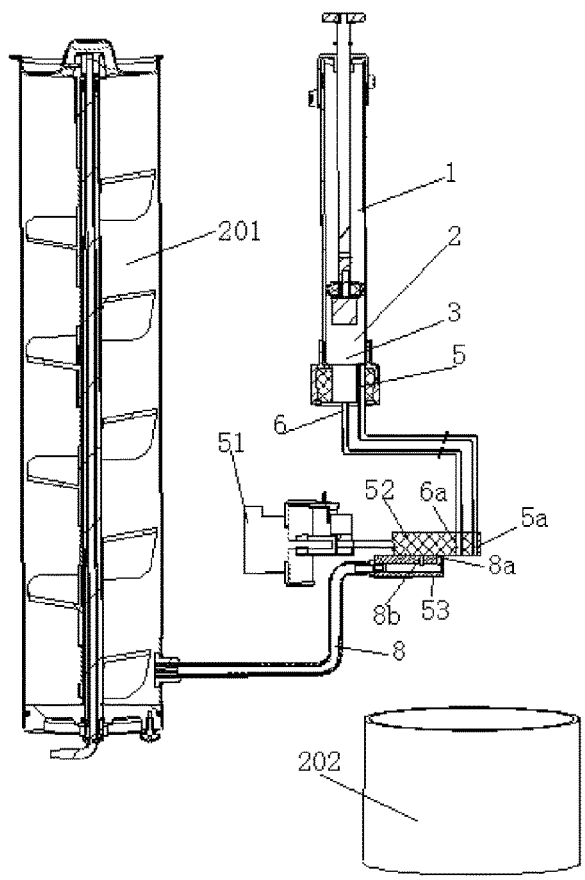
FIG. 8c is an operating diagram of a large pump when control valves are sliding valves and the small pump has a greater diameter.

When the control valves are sliding valves, as shown in FIGS. 7a, 7b and 7c, a driving slider I 52 is disposed in front of a stepper motor 51; a fixed slider II 53 is disposed below the driving slider I 52; the driving slider I 52 is provided with an elongated large pump inlet-outlet opening 5a and an elongated small pump inlet-outlet opening 6a that connect with the large pump inlet-outlet opening 5 and the small pump inlet-outlet opening 6, and a canister inlet-outlet opening is branched into a canister inlet-outlet opening I 8a and a canister inlet-outlet opening II 8b. As shown in FIG. 7a, the canister inlet-outlet opening I 8a and the canister inlet-outlet opening II 8b connect with the large pump inlet-outlet opening 5 and the small pump inlet-outlet opening 6 respectively, and then the objective of suction of colorant may be achieved by drawing the large reciprocating lever 2. As shown in FIG. 7b, the large pump inlet-outlet opening 5 connects with the canister inlet-outlet opening I 8a, and the elongated small pump inlet-outlet opening 6a is exposed as a dispensing outlet, and then the objective of the small pump operating, i.e., small-dosage dispensing of colorant, may be achieved. As shown in FIG. 7c, the elongated large pump inlet-outlet opening 5a and the elongated small pump inlet-outlet opening 6a both are exposed, and then the objective of simultaneous operation of both large and small pumps, i.e., large-dosage dispensing of colorant, may be achieved. The stepper motor 51 may drive the slider to move, thereby realizing different pipe connection modes as described above and achieving different objectives. With regard to the dispensed volume in the case a small pump is disposed within a large pump, when the small pump operates, if the small pump has a small diameter, the small pump is used for small volume dispensing, and if the small pump has a large diameter, a small volume will be dispensed via the elongated large pump inlet-outlet opening 5a. The small pump as shown in FIG. 8a, FIG. 8b and FIG. 8c has a large diameter, and then a small volume will be dispensed via the elongated large pump inlet-outlet opening 5a due to small residual area of the large pump instead of the elongated small pump inlet-outlet opening 6a. The connecting mode in FIG. 8a corresponds to that in FIG. 7a, while the connecting mode in FIG. 8c corresponds to that in FIG. 7c, and the elongated large pump inlet-outlet opening 5a in FIG. 8b is used for direct dispensing, while the elongated small pump inlet-outlet opening 6a connects with a canister. The two modes as described above are merely illustrative of the relativity of large and small pumps, and it is generally subject to that the small pump having a smaller diameter dispenses a small volume of colorant. As a simpler solution, two canister inlet-outlet openings 8a, 8b are directly driven by a motor to be directly aligned to the large pump inlet-outlet opening 5 and the small pump inlet-outlet opening 6, and the same objectives may also be achieved by sliding the two canister inlet-outlet openings 8a, 8b.

Figure 9A:
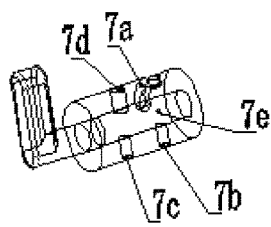
FIG. 9a is a diagram of a valve core structure when control valves are rotary valves.
Figure 9B:
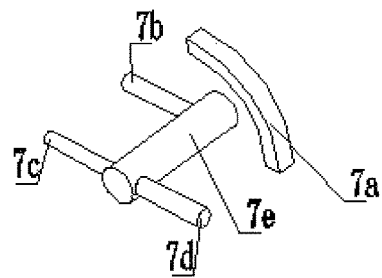
FIG. 9b is a diagram of valve core channels when control valves are rotary valves.
Figure 10A:
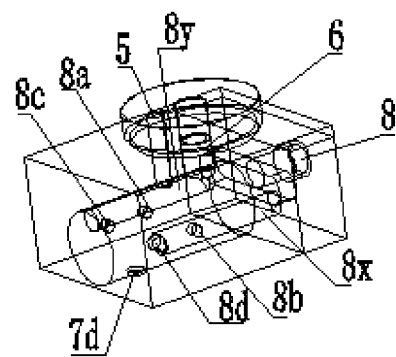
FIG. 10a is a diagram of a valve body structure when control valves are rotary valves.
Figure 10B:
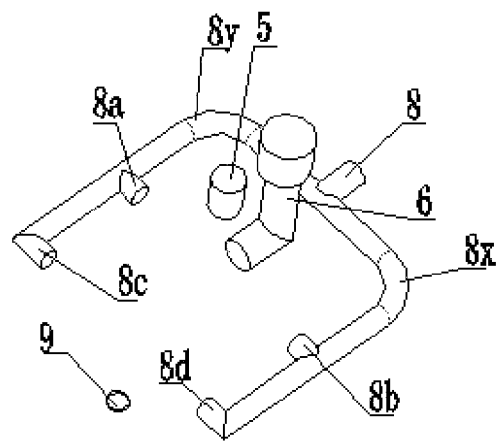
FIG. 10b is a diagram of valve body channels when control valves are rotary valves.

When the control valves are rotary valves, each control valve comprises a valve body and a valve core, as shown in FIGS. 10a and 10b. FIG. 10b is a diagram of internal colorant channels of a valve body shown in FIG. 10a. The valve body is provided with a large pump inlet-outlet opening 5 and a small pump inlet-outlet opening 6, a canister inlet-outlet opening 8 and a colorant dispensing outlet 9. The valve body may be connected to a folding pump, a piston pump or a plunger pump as described above. The colorant dispensing outlet 9 may be a window or a notch in the lower end face of the valve body, and may also be a channel, wherein the canister inlet-outlet opening 8 connects with a branch canister inlet-outlet opening I 8a by means of a first branch channel 8y and with a branch canister inlet-outlet opening II 8b by means of a second branch channel 8x. As shown in FIGS. 9a and 9b, the valve core is provided with an axial channel 7e, and a radial channel I 7b, a radial channel II 7c, and a radial channel III 7d connect with the axial channel 7e respectively; the valve core is provided in the surface thereof with an arc groove channel 7a. The arc groove channel 7a is aimed at realizing colorant channels at two positions of the surface of the valve core. However, the channel is not limited to the arc groove channel; for example, a through hole is directly bored in the surface to achieve penetration of two positions of the surface. The radial channel I 7b and the arc groove channel 7a correspond to the large pump inlet-outlet opening 5, and the axial channel 7e invariably connects with the small pump inlet-outlet opening 6.

Figure 11A:
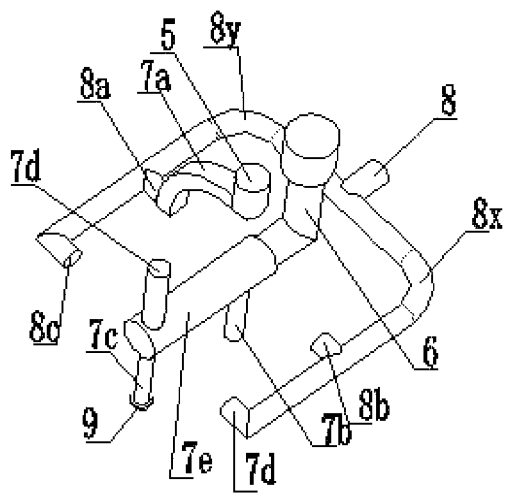
FIG. 11a is a diagram of channels for dispensing a small volume of colorant when control valves are rotary valves.

FIG. 11a shows a diagram of colorant channels within the rotary valve. When the radial channel II 7c is aligned to the colorant dispensing outlet 9, the arc groove 7a connects with the canister inlet-outlet opening I 8a; that is, the colorant from the large pump inlet-outlet opening returns to a canister through the arc groove 7a, the canister inlet-outlet opening I 8a and the first branch channel 8y; the small pump inlet-outlet opening 6 connects with the axial channel 7e, and the axial channel 7e connects with the radial channel II 7c that dispenses a small volume of colorant via the colorant dispensing outlet 9 with other channels being closed.

Figure 11B:
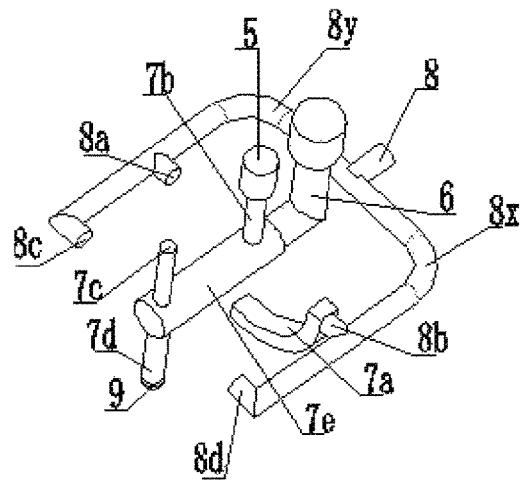
FIG. 11b is a diagram of channels for dispensing a large volume of colorant when control valves are rotary valves.

As shown in FIG. 11b, when the radial channel III 7d is aligned to the colorant dispensing outlet 9, the radial channel I 7b connects with the large pump inlet-outlet opening 5; that is, the large pump inlet-outlet opening 5 and the small pump inlet-outlet opening 6 both connect with the radial channel III 7d by means of the axial channel 7e, and the radial channel III 7d dispenses a large volume of colorant with other channels being closed.

Figure 11C:
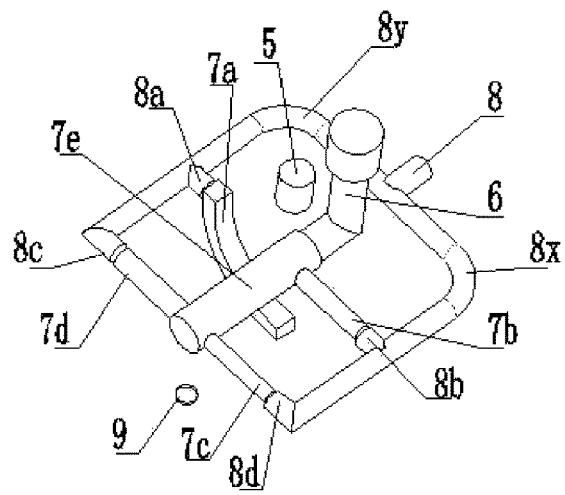
FIG. 11c is a diagram of channels for suction of colorant when control valves are rotary valves.

As shown in FIG. 11c, when the radial channel I 7b connects with the branch canister inlet-outlet opening II 8b, the small pump inlet-outlet opening 6 connects with the canister by means of the axial channel 7e, the radial channel I 7b and the branch canister inlet-outlet opening II 8b for suction of colorant.

Figure 11D:
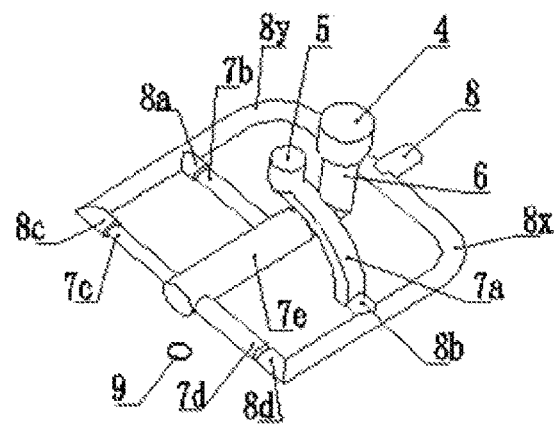
FIG. 11d is another diagram of channels in a colorant suction state when control valves are rotary valves.

As shown in FIG. 11d, when the radial channel I 7b connects with the branch canister inlet-outlet opening I 8a, the large pump inlet-outlet opening 5 connects with the canister inlet-outlet opening 8 by means of the arc groove channel 7a, the branch canister inlet-outlet opening II 8b and the second branch channel 8x, and the small pump inlet-outlet opening 6 also connects with the canister inlet-outlet opening 8 by means of the axial channel 7e, the radial channel I 7b, the branch canister inlet-outlet opening I 8a and the first branch channel 8y for suction of colorant, based on an assumption of no branch canister inlet-outlet opening III 8c and branch canister inlet-outlet opening IV 8d being present.

As shown in FIGS. 10a and 10b, the canister inlet-outlet opening 8 is branched into the canister inlet-outlet opening I 8a and the canister inlet-outlet opening III 8b, both of which are located at sides of the valve core, and further branched into a branch canister inlet-outlet opening III 8c and a branch canister inlet-outlet opening IV 8d, both of which are located at sides of the valve core; the branch canister inlet-outlet opening III 8c and the branch canister inlet-outlet opening IV 8d correspond to the radial channel II 7c and the radial channel III 7d one to one; 1) as shown in FIG. 7c, when the radial channel I 7b connects with the canister channel inlet-outlet opening II 8b, the radial channel III 7d connects with the branch canister inlet-outlet opening III 8c, and the radial channel II 7c connects with the branch canister inlet-outlet opening IV 8d, and the small pump inlet-outlet opening 6 connects with the canister for suction of colorant; and 2) as shown in FIG. 11d, when the radial channel I 7b connects with the canister channel inlet-outlet opening I 8a, the radial channel III 7d connects with the branch canister inlet-outlet opening IV 8d, and the radial channel II 7c connects with the branch canister inlet-outlet opening III 8c, and the large pump inlet-outlet opening 5 and the small pump inlet-outlet opening 6 connect with the canister for suction of colorant.

Figure 14A:
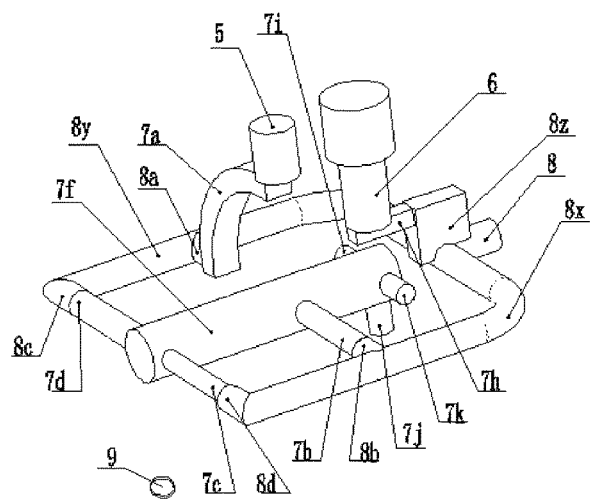
FIG. 14a is a diagram of channels for suction of colorant when control valves are another type of rotary valves.
Figure 14B:
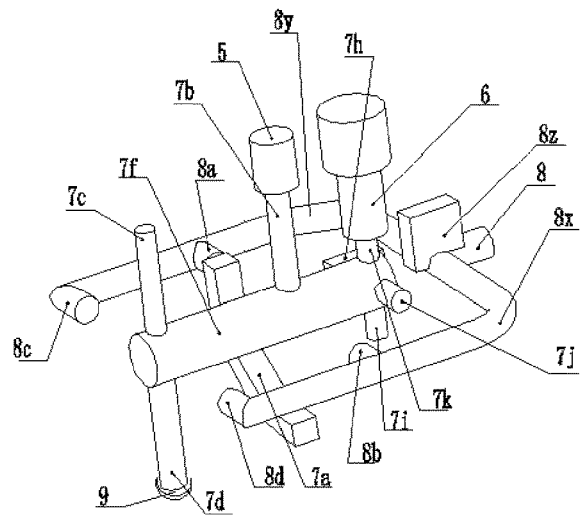
FIG. 14b is a diagram of channels for dispensing a large volume of colorant when control valves are another type of rotary valves.
Figure 14C:
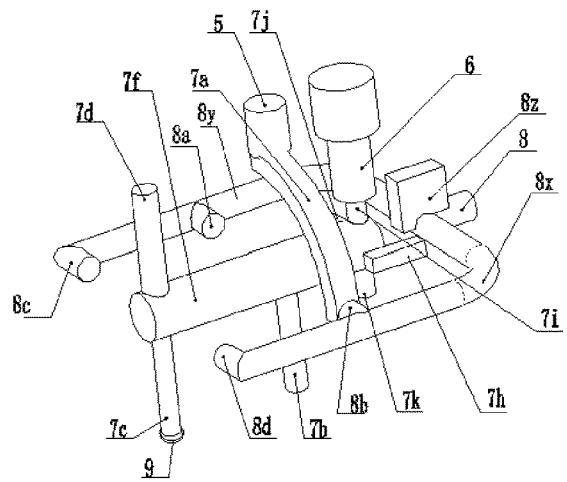
FIG. 14c is a diagram of channels for dispensing a small volume of colorant when control valves are another type of rotary valves.

FIGS. 12a, 12b, 13a and 13b show diagrams of another structure of a control valve which is a rotary valve. The control valve comprises a valve body II and a valve core II. The valve body II is provided with a large pump inlet-outlet opening 5, a small pump inlet-outlet opening 6, a canister inlet-outlet opening 8 and a colorant dispensing outlet 9, wherein the canister inlet-outlet opening 8 connects with a branch canister inlet-outlet opening I 8a by means of a first branch channel 8y and with a branch canister inlet-outlet opening II 8b by means of a second branch channel 8x, and is provided with a third branch channel 8z; the valve core II is provided with an axial channel 7f; a radial channel I 7b, a radial channel II 7c and a radial channel III 7d connect with the axial channel 7f respectively; the valve core II is provided in the surface thereof with an arc groove channel 7a; the arc groove channel 7a and the radial channel I 7b correspond to the large pump inlet-outlet opening 5; and a radial small pump channel I 7i, a radial small pump channel II 7j, a radial small pump channel III 7k and an axial small pump channel 7h are disposed axially spaced apart by 90° on the part of the axial channel 7f that corresponds to the small pump inlet-outlet opening 6:

1) in FIG. 14a, when the radial channel I 7b connects with the branch canister inlet-outlet opening II 8b, the large pump inlet-outlet opening 5 connects with the arc groove channel 7a and the branch canister channel inlet-outlet opening I 8a, and further connects with the canister inlet-outlet opening 8 by means of the first branch channel 8y; and the small pump inlet-outlet opening 6 connects with the canister inlet-outlet opening 8 by means of the axial small pump channel 7h and the third branch channel 8z for suction of colorant with other channels being closed;

2) in FIG. 14b, when the radial channel III 7d is aligned to the colorant dispensing outlet 9, the large pump inlet-outlet opening 5 connects with the axial channel 7f by means of the radial channel I 7b; the small pump inlet-outlet opening 6 connects with the axial channel 7f by means of the radial small pump channel III 7k; that is, the large pump inlet-outlet opening 5 and the small pump inlet-outlet opening 6 both connect with the radial channel III 7d by means of the axial channel 7f, and the radial channel III 7d dispenses a large volume of colorant with other channels being closed; and 3) in FIG. 14c, when the radial channel II 7c is aligned to the colorant dispensing outlet 9, the arc groove 7a connects with the canister inlet-outlet opening II 8b; that is, the colorant from the large pump inlet-outlet opening 5 returns via the second branch channel 8x; the small pump inlet-outlet opening 6 connects with the axial channel 7f by means of the radial small pump channel I 7i; the axial channel 7f connects with the radial channel II 7c that dispenses a small volume of colorant via the colorant dispensing outlet 9 with other channels being closed. The above description is based on an assumption of no branch canister inlet-outlet opening III 8c and branch canister inlet-outlet opening IV 8d being present.

Figure 12A:
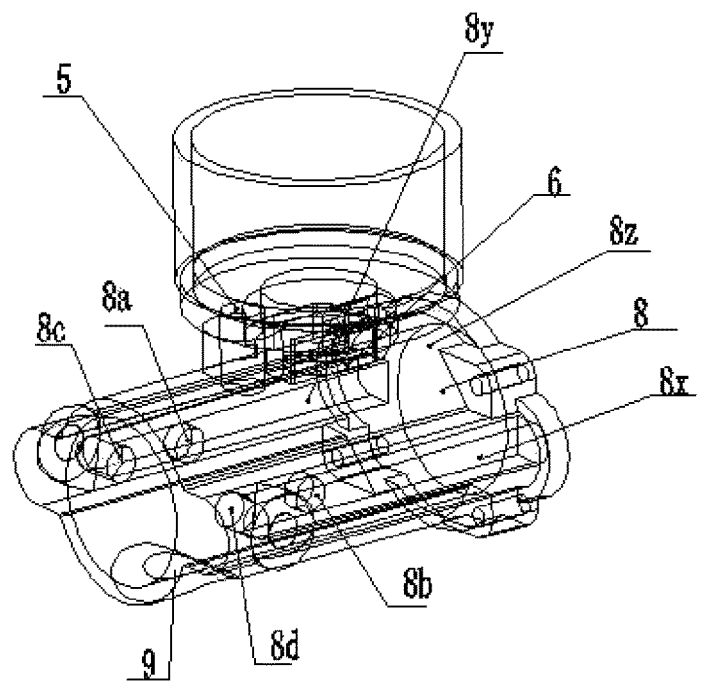
FIG. 12a is a diagram of a valve body structure when control valves are another type of rotary valves.
Figure 12B:
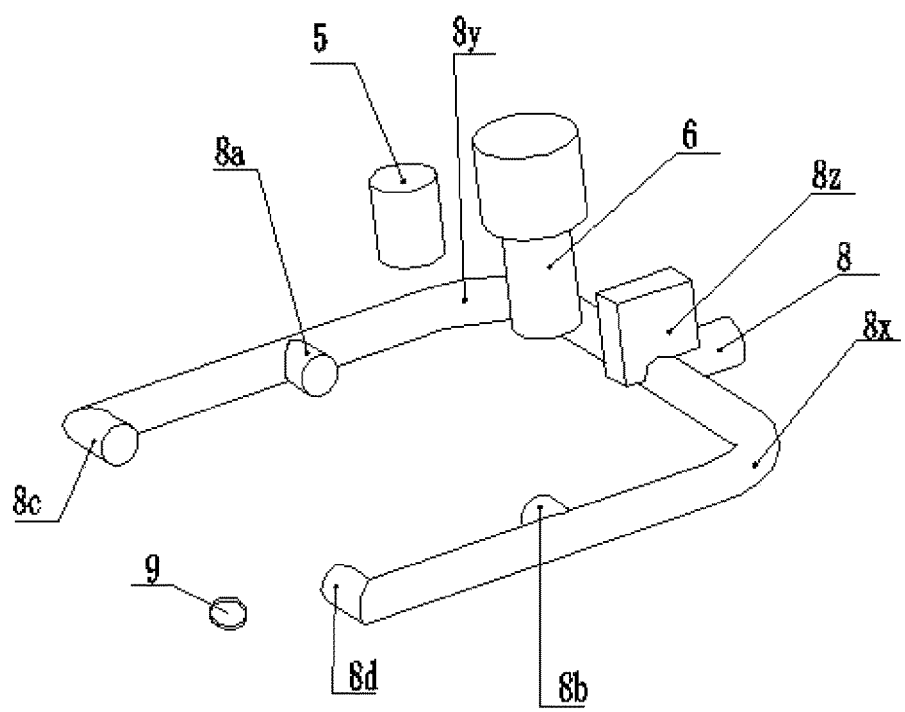
FIG. 12b a diagram of valve body channels when control valves are another type of rotary valves.
Figure 13A:
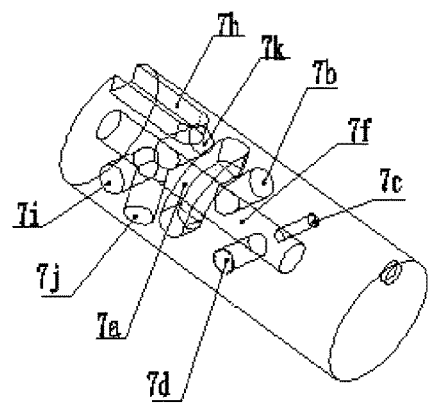
FIG. 13a is a diagram of a valve core structure when control valves are another type of rotary valves.
Figure 13B:
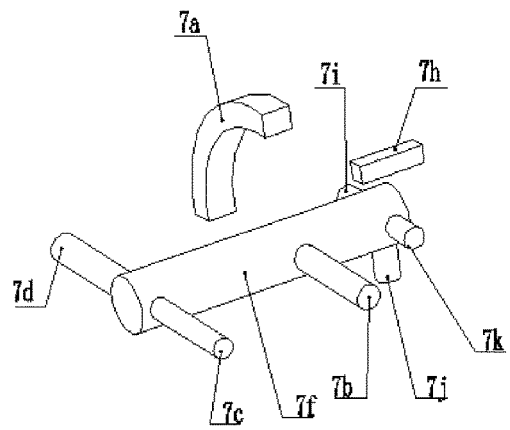
FIG. 13b is a diagram of valve core channels when control valves are another type of rotary valves.
Figure 14D:
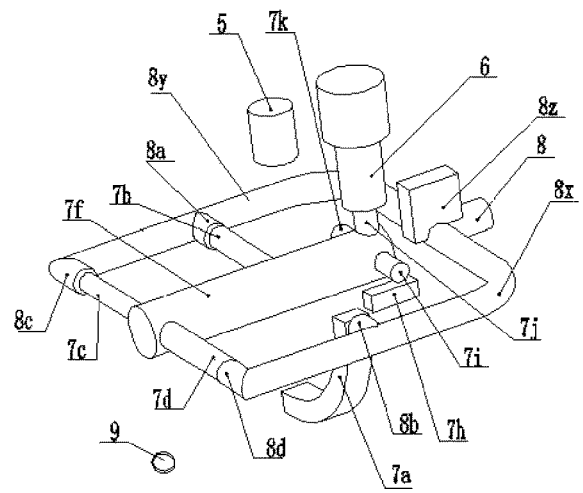
FIG. 14d is a diagram of cleaning pump body channels when control valves are another type of rotary valves.

As shown in FIGS. 12a and 12b, the canister inlet-outlet opening 8 is branched into the canister inlet-outlet opening I 8a and the canister inlet-outlet opening II 8b, both of which are located at sides of the valve core, and further branched into a canister inlet-outlet opening III 8c and a canister inlet-outlet opening IV 8d, both of which are located at sides of the valve core; the canister inlet-outlet opening III 8c and the canister inlet-outlet opening IV 8d correspond to the radial channel II 7c and the radial channel III 7d; 1) as shown in FIG. 14a, when the radial channel I 7b connects with the canister channel inlet-outlet opening II 8b, the radial channel III 7d connects with branch canister inlet-outlet opening III 8c, and the radial channel II 7c connects with branch canister inlet-outlet opening IV 8d for suction of colorant; and 2) as shown in FIG. 14d, when the radial channel I 7b connects with the canister channel inlet-outlet opening I 8a, the radial channel II 7c connects with the branch canister inlet-outlet opening III 8c, and the radial channel III 7d connects with the canister inlet-outlet opening IV 8d; the small pump inlet-outlet opening 6 connects with a canister, and the large pump inlet-outlet opening is closed; and in addition to suction of a small volume of colorant, the colorant at the exits of the radial channel II 7c and the radial channel III 7d may be washed away through suction and drainage of the colorant. It needs to be noted that paint being at a standstill in a pipe is also prone to cause uneven mixing of the paint. In FIG. 14d, the length of a small reciprocating lever projecting into a small cylinder body is greater than or equal to the stroke of a large reciprocating lever. As such, when the small reciprocating lever does not project into the small cylinder body, the large reciprocating lever is put into reciprocating motion to wash against the pipe.

Figure 15:
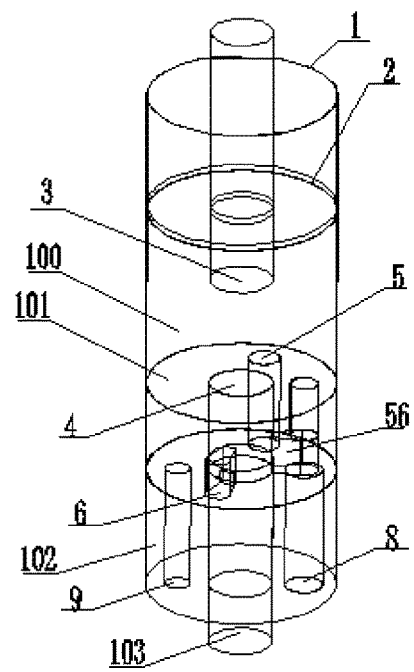
FIG. 15 is a diagram of an overall structure of a control valve comprising a rotary valve core IV.
Figure 15A:
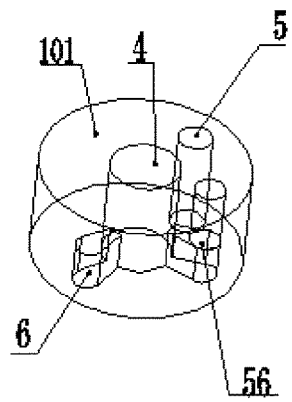
FIG. 15a is a structural diagram of a rotary valve core when the control valve comprises the rotary valve core IV.
Figure 15B:
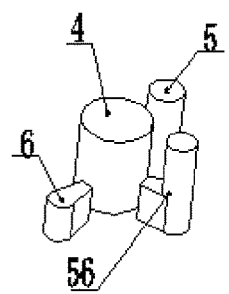
FIG. 15b is a diagram of channels of a rotary valve core when the control valve comprises the rotary valve core IV.
Figure 16A:
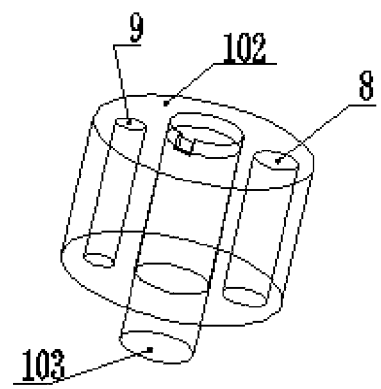
FIG. 16a is a structural diagram of a base of a large cylinder body when the control valve comprises the rotary valve core IV.
Figure 16B:
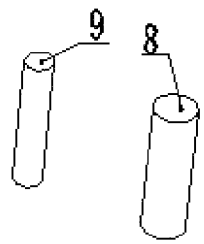
FIG. 16b is a diagram of channels of the base of the large cylinder body when the control valve comprises the rotary valve core IV.
Figure 17A:
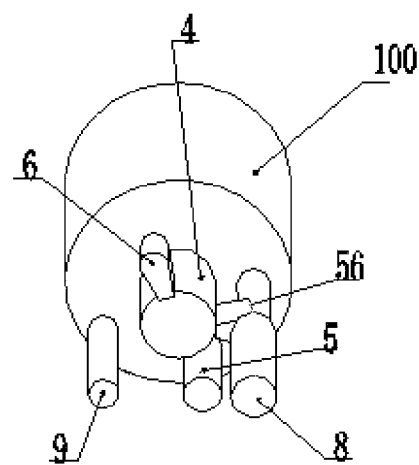
FIG. 17a is a diagram of channels for suction of colorant when the control valve comprises the rotary valve core IV.
Figure 17B:
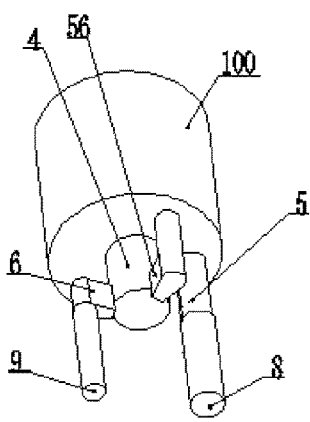
FIG. 17b is a diagram of channels for dispensing a small volume of colorant when the control valve comprises the rotary valve core IV.
Figure 17C:
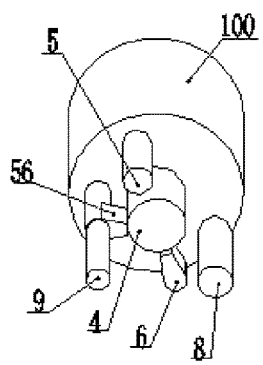
FIG. 17c is a diagram of channels for dispensing a large volume of colorant when the control valve comprises the rotary valve core IV.

FIG. 15 is a diagram of a control valve with another structure. As shown in FIGS. 15, 16a and 16b, a base 102 of a large cylinder body 1 is provided with a dispensing outlet 9 and a canister channel 8; a rotating shaft 103 is disposed in the axis of the base 102; and a rotary valve core IV 101 is disposed in the large cylinder body 1. As shown in FIGS. 15a and 15b, a small cylinder body 4 is disposed in the axis of the rotary valve core IV 101, and a small pump inlet-outlet opening 6 radially projects out of the small cylinder body 4; a large pump inlet-outlet opening 5 is provided outside the small cylinder body 4, and another inlet-outlet opening projects out of the small cylinder body 4, and connects with another inlet-outlet opening of the large pump to form a combined inlet-outlet opening 56. Thus, the valve core 101 is rotated such that: 1) as shown in FIG. 17a, the combined inlet-outlet opening 56 is aligned to the canister channel 8 for suction of colorant, allowing colorant 100 to flow into the cylinder body; 2) as shown in FIG. 17b, the small pump inlet-outlet opening 6 is aligned to the dispensing outlet 9 to dispense a small volume of colorant, and the large pump inlet-outlet opening 5 connects with the canister inlet-outlet opening 8, thereby allowing return from the large pump inlet-outlet opening 5 to a canister; and 3) as shown in FIG. 17c, the large pump inlet-outlet opening 5 or the combined inlet-outlet opening 56 is aligned to the dispensing outlet 9 to dispense a large volume of colorant.

A reciprocating positive displacement pump may also be composed of one large pump and two or three small pumps.

Figure 18:
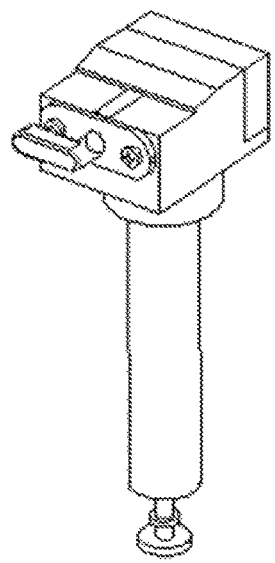
FIG. 18 is an upside-down structural diagram of a colorant pump in the present invention.

The reciprocating positive displacement pump may also be of an upside-down structure, as shown in FIG. 18. The upside-down structure is conducive to air removal and improvement of the stability of the colorant dispensing accuracy.

Driving for the large reciprocating part in the present invention includes manual driving, stepper motor driving, and servo motor driving. Position changeover of the control valves in the present invention includes changeover achieved manually, or by a stepper motor, a synchronous motor or a slowdown motor with position changeover control. By changing the directions and positions of the control valves, the objectives of suction of colorant, dispensing of a small volume of colorant, dispensing of a large volume of colorant, air removal and pump cleaning may be achieved and the accuracy and efficiency of colorant dispensing are guaranteed.

The pump capable of dispensing both a large volume and a small volume of colorant in the present invention conveniently achieves the objective of dispensing both a large volume and a small volume of colorant by simply rotating the control valves or pushing the sliding valves. Moreover, as the large reciprocating lever and the small reciprocating rod are formed into an integrated body, the problems that the accuracy is influenced by the telescoping force of a spring and a strict requirement is made to the leakproofness in the structure of patent US2009236367 is avoided.

The invention claimed is:

1. A pump capable of dispensing both a large volume and a small volume of colorant, comprising a large reciprocating positive displacement pump that comprises a large reciprocating part, a large pump body and a large pump inlet-outlet opening, characterized in that: a small large reciprocating part fixed to the large reciprocating part is disposed in the large pump body; a small pump body is disposed on a base of the large pump body and provided with a small pump inlet-outlet opening; and the small large reciprocating part, the small pump body and the small pump inlet-outlet opening constitute a small reciprocating positive displacement pump, wherein control valves are disposed to control the large pump inlet-outlet opening and the small pump inlet-outlet opening to connect with a canister or to dispense colorant.

2. The pump capable of dispensing both a large volume and a small volume of colorant of claim 1, wherein the small pump body being disposed on the base of a large pump body means that the small pump body is disposed within the base of the large pump body.

3. The pump capable of dispensing both a large volume and a small volume of colorant of claim 1, wherein the small pump body being disposed on the base of a large pump body means that the small pump body extends from a surface of the base of the large pump body.

4. The pump capable of dispensing both a large volume and a small volume of colorant of claim 1, wherein the large reciprocating positive displacement pump is a large folding pump, a large plunger pump or a large piston pump; the small reciprocating part is a small piston assembly or a small plunger rod; the small pump body is a small cylinder body; a maximum length of the small piston assembly or the small plunger rod projecting into the small cylinder body is less than a stroke of the large reciprocating part; and when the small piston assembly or the small plunger rod extends into the small cylinder body, the small piston assembly or the small plunger rod, the small cylinder body and the small pump inlet-outlet opening constitute a small plunger pump or a small piston pump.

5. The pump capable of dispensing both a large volume and a small volume of colorant of claim 1, wherein the large pump inlet-outlet opening and the small pump inlet-outlet opening are controlled by the control valves to connect with the canister or to the dispense colorant, with at least the following three connecting structures being involved:
   1) where the large pump inlet-outlet opening connects with the canister; the small pump inlet-outlet opening connects with the canister; the large pump inlet-outlet opening and the small pump inlet-outlet opening both connect with the canister; or the combination thereofs
   2) where dispensing via only the large pump inlet-outlet opening or dispensing via both the large pump inlet-outlet opening and the small pump inlet-outlet opening is allowed; or the large pump inlet-outlet opening connects with a colorant dispensing outlet for dispensing, or the large pump inlet-outlet opening and the small pump inlet-outlet opening both connect with the colorant dispensing outlet for dispensing; and
   3) where dispensing via only the small pump inlet-outlet opening is allowed, or the small pump inlet-outlet opening connects with the colorant dispensing outlet for dispensing.

6. The pump capable of dispensing both a large volume and a small volume of colorant of claim 5, wherein the control valves are sliding valves in which: a driving slider I is provided with an elongated large pump inlet-outlet opening and an elongated small pump inlet-outlet opening that connects with a large pump inlet-outlet opening and a small pump inlet-outlet opening, and a canister inlet-outlet opening is branched into a canister inlet-outlet opening I and a canister inlet-outlet opening II:
   1) the canister inlet-outlet opening I and the canister inlet-outlet opening II connect with the large pump inlet-outlet opening and the small pump inlet-outlet opening, respectively;
   2) the elongated large pump inlet-outlet opening and the elongated small pump inlet-outlet opening are both exposed; and
   3) the large pump inlet-outlet opening connect with the canister inlet-outlet opening I, and the elongated small pump inlet-outlet opening is exposed to serve as a dispensing outlet.

7. The pump capable of dispensing both a large volume and a small volume of colorant of claim 5, wherein the control valve comprises a valve body and a valve core; the valve body is provided with a large pump inlet-outlet opening, a small pump inlet-outlet opening, a canister inlet-outlet opening and a colorant dispensing outlet, wherein the canister inlet-outlet opening connects with a branch canister inlet-outlet opening I by means of a first branch channel and with a branch canister inlet-outlet opening II by means of a second branch channel; the valve core is provided with an axial channel; a radial channel I, a radial channel II and a radial channel III connects with the axial channel respectively; the valve core is provided in a surface thereof with an arc groove channel; the arc groove channel and the radial channel I correspond to the large pump inlet-outlet opening, and the axial channel invariably connects with the small pump inlet-outlet opening (6):
   1) when the radial channel I connects with the branch canister inlet-outlet opening II, the radial channel I connects with a canister for suction of colorant; and when the radial channel I connects with the branch canister channel inlet-outlet opening I, the arc groove channel and the radial channel I both connect with the canister channel inlet-outlet opening for suction of the colorant;
   2) when the radial channel III is aligned to the colorant dispensing outlet (9), the radial channel I connects with the large pump inlet-outlet opening; that is, the large pump inlet-outlet opening and the small pump inlet-outlet opening both connect with the radial channel III by means of the axial channel, and the radial channel III dispenses a large volume of colorant with other channels being closed; and 3) when the radial channel II is aligned to the colorant dispensing outlet, the arc groove connects with the canister inlet-outlet opening I; that is, a colorant from the large pump inlet-outlet opening returns; the small pump inlet-outlet opening connects with the axial channel that connects with the radial channel II, and the radial channel II dispenses a small volume of colorant by means of the colorant dispensing outlet with the other channels being closed.

8. The pump capable of dispensing both a large volume and a small volume of colorant of claim 7, wherein the canister inlet-outlet opening is branched into the canister inlet-outlet opening I and the canister inlet-outlet opening III, both of which are located at sides of the valve core, and further branched into a canister inlet-outlet opening III and a canister inlet-outlet opening IV, both of which are located at sides of the valve core; the canister inlet-outlet opening III and the canister inlet-outlet opening IV correspond to the radial channel II and the radial channel III; 1) when the radial channel I connects with the canister channel inlet-outlet opening II , the radial channel III connects with the branch canister inlet-outlet opening III, and the radial channel II connects with the branch canister inlet-outlet opening IV, and the small pump inlet-outlet opening connects with the canister for suction of the colorant; and 2) when the radial channel I connects with the canister channel inlet-outlet opening I, the radial channel III connects with the branch canister inlet-outlet opening IV, and the radial channel II connects with the branch canister inlet-outlet opening III, and the large pump inlet-outlet opening and the small pump inlet-outlet opening connect with the canister for suction of the colorant.

9. The pump capable of dispensing both a large volume and a small volume of colorant of claim 5, wherein the control valve comprises a valve body II and a valve core II; the valve body II is provided with a large pump inlet-outlet opening, a small pump inlet-outlet opening, a canister inlet-outlet opening and a colorant dispensing outlet, wherein the canister inlet-outlet opening connects with a branch canister inlet-outlet opening I by means of a first branch channel and with a branch canister inlet-outlet opening II by means of a second branch channel, and is provided with a third branch channel; the valve core II is provided with an axial channel; a radial channel I, a radial channel II and a radial channel III connect with the axial channel respectively; the valve core II is provided in a surface thereof with an arc groove channel; the arc groove channel and the radial channel I correspond to the large pump inlet-outlet opening (5); and a radial small pump channel I, a radial small pump channel II, a radial small pump channel III and an axial small pump channel are disposed axially spaced apart by 90° on the part of the axial channel that corresponds to the small pump inlet-outlet opening:

1) when the radial channel I connects with the branch canister inlet-outlet opening II, the radial channel I is connected, and the large pump inlet-outlet opening connects with the arc groove channel and the branch canister channel inlet-outlet opening I; and the small pump inlet-outlet opening connects with the canister inlet-outlet opening by means of the axial small pump channel for suction of the colorant with the other channels being closed;

2) when the radial channel III is aligned to the colorant dispensing outlet, the large pump inlet-outlet opening connects with the axial channel by means of the radial channel I; the small pump inlet-outlet opening connects with the axial channel by means of the radial small pump channel III; that is, the large pump inlet-outlet opening and the small pump inlet-outlet opening both connect with the radial channel III by means of the axial channel, and the radial channel III dispenses a large volume of colorant with other channels being closed; and 3) when the radial channel II is aligned to the colorant dispensing outlet, the arc groove connects with the canister inlet-outlet opening II; that is, a colorant from the large pump inlet-outlet opening returns; the small pump inlet-outlet opening connects with the axial channel by means of the radial small pump channel I; the axial channel connects with the radial channel II that dispenses a small volume of colorant via the colorant dispensing outlet with other channels being closed.

10. The pump capable of dispensing both a large volume and a small volume of colorant of claim 9, wherein the canister inlet-outlet opening is branched into the canister inlet-outlet opening I and the canister inlet-outlet opening III, both of which are located at sides of the valve core, and further branched into a canister inlet-outlet opening III and a canister inlet-outlet opening IV, both of which are located at sides of the valve core; the canister inlet-outlet opening III and the canister inlet-outlet opening IV correspond to the radial channel II and the radial channel III; 1) when the radial channel I connects with canister channel inlet-outlet opening II, the radial channel III connects with the branch canister inlet-outlet opening III, and the radial channel II connects with the canister inlet-outlet opening IV; and 2) when the radial channel I (7b) connects with canister channel inlet-outlet opening I, the radial channel II connects with the branch canister inlet-outlet opening III, and the radial channel III connects with the canister inlet-outlet opening IV.

11. The pump capable of dispensing both a large volume and a small volume of colorant of claim 5, wherein in the control valves, the dispensing outlet and a canister channel are provided in a base of a large cylinder body; a rotary valve core IV is disposed in the large cylinder body; the small cylinder body is disposed in an axis of the rotary valve core IV, and a small pump inlet-outlet opening radially projects out of the small cylinder body; a large pump inlet-outlet opening is provided outside the small cylinder body, and another inlet-outlet opening projects out of the small cylinder body, and connects with another inlet-outlet opening of the large pump to form a combined inlet-outlet opening;

1) the combined inlet-outlet opening is aligned to the canister channel for suction of colorant;
2) the large pump inlet-outlet opening or the combined inlet-outlet opening is aligned to the dispensing outlet to dispense a large volume of colorant; and
3) the small pump inlet-outlet opening is aligned to the dispensing outlet to dispense a small volume of colorant.

12. A pump capable of dispensing both a large volume and a small volume of colorant, comprising a large reciprocating positive displacement pump that comprises a large reciprocating part, a large pump body and a large pump inlet-outlet opening, characterized in that: a small large reciprocating part fixed to the large reciprocating part is disposed in the large pump body; a small pump body is disposed on a base of the large pump body and provided with a small pump inlet-outlet opening; and the small large reciprocating part, the small pump body and the small pump inlet-outlet opening constitute a small reciprocating positive displacement pump, wherein the large reciprocating positive displacement pump is a large folding pump, a large plunger pump or a large piston pump, and the small reciprocating positive displacement pump is a small folding pump.

13. A pump capable of dispensing both a large volume and a small volume of colorant, comprising a large reciprocating positive displacement pump that comprises a large reciprocating part, a large pump body and a large pump inlet-outlet opening, characterized in that: a small large reciprocating part fixed to the large reciprocating part is disposed in the large pump body; a small pump body is disposed on a base of the large pump body and provided with a small pump inlet-outlet opening; and the small large reciprocating part, the small pump body and the small pump inlet-outlet opening constitute a small reciprocating positive displacement pump, wherein the large reciprocating positive displacement pump is a large folding pump, a large plunger pump or a large piston pump, and the small reciprocating positive displacement pump is a small plunger pump or a small piston pump with a small piston rod or a small plunger rod thereof projecting into a small cylinder body a length greater than or equal to a stroke of the large reciprocating part.

14. The pump capable of dispensing both a large volume and a small volume of colorant of claim 13, wherein the small pump body and the large pump body are disposed coaxially.

* * * * *